J. G. JACKSON.
BAKING PAN.
APPLICATION FILED APR. 5, 1920.
1,416,208.  Patented May 16, 1922.
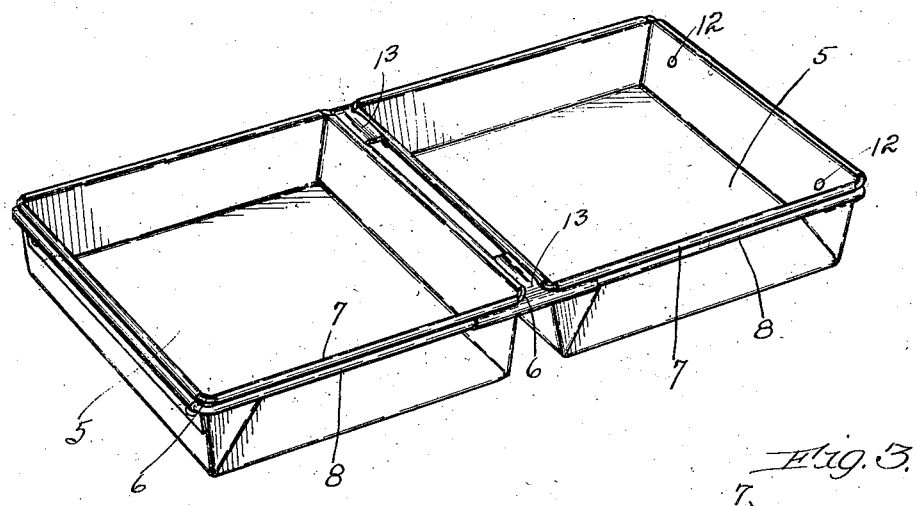
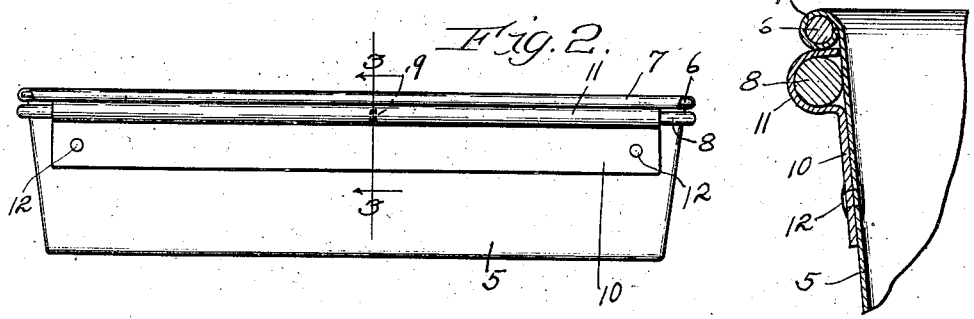
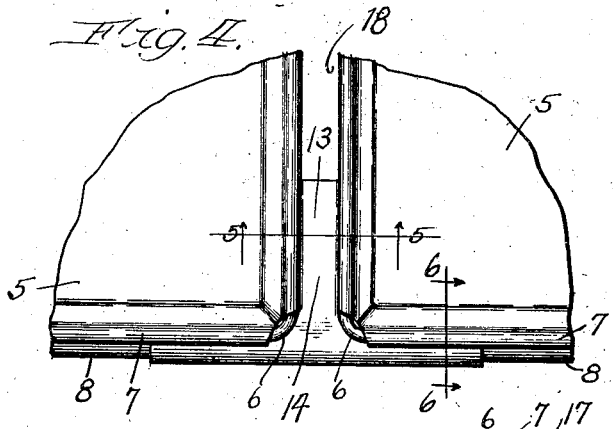
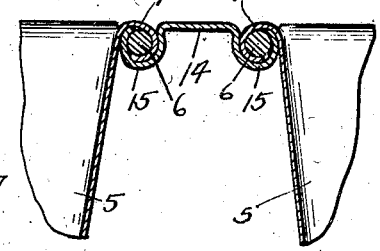
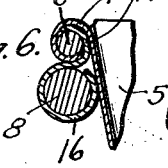
Inventor,
Joseph G. Jackson,
Charles M. Nissen
Atty

UNITED STATES PATENT OFFICE.

JOSEPH GEORGE JACKSON, OF CHICAGO, ILLINOIS, ASSIGNOR TO EDWARD KATZINGER COMPANY, OF CHICAGO, ILLINOIS, A CORPORATION OF ILLINOIS.

BAKING PAN.

1,416,208.

Specification of Letters Patent.   Patented May 16, 1922.

Application filed April 5, 1920. Serial No. 371,224.

*To all whom it may concern:*

Be it known that I, JOSEPH GEORGE JACKSON, a citizen of the United States, and a resident of the city of Chicago, in the county of Cook and State of Illinois, have invented certain new and useful Improvements in Baking Pans, of which the following is a specification.

My invention relates to bake pan sets and has for one of its objects the provision of a simple and efficient means for securely holding the individual pans of the bake pan set in a rigid construction.

A further object is the provision of a simple and efficient frame construction of wire or the like for bake pan sets with means for locking the individual pans in the set.

Other objects will appear hereinafter.

An embodiment of my invention is shown in the accompanying drawing forming a part of this specification, and in which, Fig. 1 is a perspective view of a bake pan set embodying my invention, Fig. 2 is an end view of the same, Fig. 3 is an enlarged fragmental section taken through an end pan of the set, Fig. 4 is an enlarged fragmental plan view of the connection between two individual pans, and Figs. 5 and 6 are sections taken on line 5—5 and 6—6 respectively of Fig. 4.

Referring more particularly to the drawing, I have indicated a pan set as being made up of two individual pans 5, but it will be understood that any number of pans desired may be formed into a set by making the frame of proper size and strength.

The pans 5 may be of any desired construction. The form I have illustrated is the usual structure in which the sheet metal of the pan is turned around a wire 6 to form a rim 7.

In order to form a bake pan set of two or more pans rigidly connected together, I have provided a strong wire frame located under the rims 7, as indicated at 8 in the drawings. The wire frame 8 may consist of a continuous length with its ends adjacent each other, as indicated at 9 in Fig. 2. Such a continuous length of wire may be bent in an obvious manner to fit under the rims 7, as shown in Fig. 1.

On the exterior end surfaces of the remote sides of the end pans I provide plates of sheet material 10 having upper curved portions 11 disposed around the rod 8, as shown in Figs. 2 and 3. This sheet material holder 10 for the rod 8 may be secured to the pans 5 in any desired manner such as by means of rivets, as indicated at 12.

The separators 13 are located between the pans, as shown in Fig. 1, and secured thereto, as shown in Fig. 5. It should be understood that when more than two pans are secured together in a set, there are two separators 13 in the space between each adjacent pair of pans. These separators 13 are substantially alike and the description of one will suffice for all. Each separator 13 has a substantially flat portion 14, as shown in Fig. 5, with its longitudinal edges 15 turned in around the wire 6 of the two adjacent pans under the pan wall material of the rim 7.

The separators 13 are substantially T-shaped, the stem portion being the flat part 14. The head portion of the T is curved so as to be S-shaped in cross-section, as shown in Fig. 6. One longitudinal edge 16 is turned around the rod 8 and the other longitudinal edge 17 is turned in around the wire 6 under the pan material of the rim 7. It should be understood that the T-shaped extension of the separator is thus secured to both of the rims of the adjacent pans as well as to the rod 8. With this construction each separator 13 is securely fastened to the sides and ends of the adjacent corners of the pans 5 and is also secured to the frame bars 8 so that the adjacent corners of the pans are rigidly secured together and to the frame bars 8. The pans are thus maintained in spaced relation by providing a space 18 between the pans for the circulation of heated air to assure even baking of the material in the pans, but it should be particularly noted that by extending the separators 13 and securing them to the ends of the pans, as well as to the rod 8, such separators assist materially in holding the frame rod 8 in proper position and said separators cooperate with the rod to secure a rigid bake pan set. In view of this construction it will be seen that the rods 8 may extend in both directions from the separator 13 along the ends of the pans under the rim 7 and the ends of the rods 8 secured to the pans in any desired manner. For instance, instead of having a single rod 8 of a continuous length, there may be two separate rods each with its ends bent so as to fit into the opening in the curved portion 11 of the holders 10.

Obviously those skilled in the art may make various changes in the details and arrangement of parts without departing from the spirit and scope of my invention as defined by the claims hereto appended. I wish, therefore, not to be restricted to the precise construction herein disclosed.

What I claim and desire to have secured by Letters Patent of the United States, is:

1. A bake pan set comprising a plurality of individual pans, a wire frame cylindrical in cross-section disposed around the set of pans, and fastening members separate from and secured to the pans and located at adjacent pan corners for connecting the pans to said wire frame.

2. A bake pan set comprising a plurality of individual pans, means for connecting the pans in the set, such means comprising a round wire rod disposed under the rims of adjacent pans, and a connection turned around said wire rod and secured to adjacent corners of the pans.

3. A bake pan set comprising a plurality of individual pans, bars extending along the ends of the individual pans, and separators between adjacent corners of and connected to the pans said separators being also turned around and clamped on said bars between the pans.

4. A bake pan set comprising a plurality of individual pans, of bars extending along the ends of said pans and having their end portions connected to said pans, separators between the corners of said pans and secured rigidly to the latter, and extensions from said separators clamped on said bars between the pans.

5. A bake pan set comprising a plurality of individual pans, each having a wired rim, a wire frame disposed around said individual pans, and a member at each pair of adjacent pan corners with portions thereof turned in around the wire of the rim at a side and end of each pan of said pan corners and a portion secured to the wire frame.

6. A bake pan set comprising a plurality of individual pans, each having a wired rim; a wire frame disposed around said individual pans, and a member at each pair of adjacent pan corners having three main portions, one portion having its longitudinal edges turned in around the wires at the sides of the adjacent pans and each of the other two main portions having one longitudinal edge turned in around the wire of the rim at the end of one of the adjacent pans and its other longitudinal edge turned around the frame.

7. A bake pan set comprising a plurality of individual pans having wired rims, bars along the ends of the individual pans, and sheet material members in the ends of the spaces between the adjacent edges of the pans, said members having portions attached to both the sides and ends of the pans and portions attached to said bars.

8. A bake pan set comprising a plurality of individual pans having wired rims, a frame disposed around the individual pans, sheet material members, each member being attached to the side and end of one individual pan and to the frame, and a sheet material member disposed around the frame at the outer side of each end pan and secured to the latter.

9. A bake pan set comprising a plurality of individual pans having wired rims, a frame disposed around the individual pans, sheet material members each having a substantially flat part with the longitudinal edges of the flat part disposed around the wires under the pan wall material of two adjacent pans and a part at the end of the flat part having one longitudinal edge disposed around the frame and portions of the other longitudinal edge disposed around the wires under the pan wall material of the rims of two adjacent pans at the ends of the latter.

10. A bake pan set comprising a plurality of individual pans, a frame disposed around the individual pans, sheet material members, each being generally T-shaped with the longitudinal edges of the stem portion of the T attached to the adjacent edges of two adjacent pans and one longitudinal edge portion of the head of the T attached to the frame and the other longitudinal edge of the head of the T attached to the ends of the individual pans.

11. A bake pan set comprising a plurality of pans in spaced-apart relation, a wire frame, tubular supports for said frame at the ends of said set, spreaders secured to said pans at adjacent corners thereof, and extensions from said spreaders wrapped around said wire frame to secure the latter to the bake pan set.

12. A bake pan set comprising a plurality of pans, a wire frame therefor, means at the ends of the set to slidably receive the ends of said frame, spreaders secured to the pans at the adjacent corners thereof, and extensions on said spreaders curled around said frame to secure the latter to the bake pan set.

13. A bake pan set comprising a plurality of wire rimmed pans, a frame, means for securing said frame to the ends of the outermost pans in the set, spreaders secured to the pan rims to rigidly connect the pans and hold them in spaced-apart relation, and extensions on said spreaders adapted to be wrapped around said frame to secure the latter to the bake pan set intermediate the ends of the latter.

14. A bake pan set comprising a plurality of pans in spaced-apart relation and each having a wire rim, a wire frame extending around the bake pan set under the outside wired rims, means at the ends of the set for holding said frame in such position, a plurality of individual spreaders having lateral portions clamped under adjacent corner portions of the wire rimmed pans to rigidly connect them together in spaced-apart relation, and means extending from said spreaders and curled around said wire frame to secure the latter in its position under the outside rims of the pans.

15. An integral sheet metal stamping having spaced-apart curved lateral portions adapted to fit and to be clamped to the under sides of adjacent wired rims of pans at the corner portions thereof, and having a right-angular portion bent to form a tubular support for a frame extending along the outside rims of the pans.

16. A pan securing member for multiple baking pans comprising a piece of sheet metal having a narrow central plane portion with curved portions at the edges thereof adapted to be secured under pan rims, and having another portion at an angle to said plane portion adapted to be wrapped around a pan frame.

17. A pan securing member for multiple baking pans comprising a sheet metal member having a spreader portion with curved rim-engaging extensions and a curved frame engaging portion at right angles to said spreader portion.

18. A pan securing member for multiple bake pans comprising a sheet metal blank T-shaped and having spaced-apart curved portions adapted to be stamped under the rims of the pans to rigidly connect them together in spaced-apart relation, and having also another curved portion adapted to surround a frame for the multiple bake pans.

In testimony whereof I have signed my name to this specification on this 26th day of March, A. D. 1920.

JOSEPH GEORGE JACKSON.